United States Patent [19]

Cabell et al.

[11] Patent Number: 4,459,821

[45] Date of Patent: Jul. 17, 1984

[54] BEVERAGE VEHICLE BULKHEAD AND METHOD OF CONSTRUCTING SAME

[75] Inventors: Paul C. Cabell; Robert L. Kimmich, both of Johnson County, Kans.

[73] Assignee: The Hesse Corporation, Kansas City, Mo.

[21] Appl. No.: 404,604

[22] Filed: Aug. 2, 1982

[51] Int. Cl.³ .............................................. B60H 3/04
[52] U.S. Cl. ...................................... 62/239; 62/263; 62/438; 62/516; 296/24 B
[58] Field of Search ...................... 62/239, 438, 259.1, 62/515, 516, 524, 430, 263; 296/24 R, 24 B; 52/416, 417, 461, 464, 588

[56] References Cited

U.S. PATENT DOCUMENTS

| | | | |
|---|---|---|---|
| 948,143 | 2/1910 | Knox | 62/524 |
| 1,639,528 | 8/1927 | Meyer | 62/239 X |
| 2,012,308 | 8/1935 | Heitman | 62/438 |
| 2,241,411 | 5/1941 | McGuffey | 62/430 X |
| 2,289,728 | 7/1942 | Rees | 62/438 X |
| 2,405,432 | 8/1946 | Kleist | 62/259.1 |
| 2,436,390 | 2/1948 | Kleist | 62/430 X |
| 2,638,754 | 5/1953 | Kleist | 62/430 |
| 2,690,653 | 10/1954 | Kleist | 62/430 |
| 3,090,212 | 5/1963 | Anderson et al. | 62/239 X |
| 3,293,868 | 12/1966 | Gonzalez | 62/259.1 X |
| 4,080,906 | 3/1978 | Brown | 296/24 R X |
| 4,300,323 | 11/1981 | Meechan et al. | 52/461 X |

Primary Examiner—William E. Tapoicai
Attorney, Agent, or Firm—Kokjer, Kircher, Bradley, Wharton, Bowman & Johnson

[57] ABSTRACT

A bulkhead for a cargo carrying vehicle and method of constructing same is the subject of the present invention. First and second uniform extruded sections are provided, each of which presents alternating web portions and open areas sandwiched between generally planar surfaces. Plate connecting means is interposed between the two extruded sections and presents first and second connecting surfaces which are aligned with the first and second planar surfaces. First and second channel means disposed across the ends of the extruded sections place each of the open areas in closed communication with an adjacent area. The open areas may be utilized to house a refrigerant conduit and a freezable media so as to convert the bulkhead into a self-contained cold plate. Alternatively, a heating element may be placed in the open areas so as to convert the bulkhead to a hot plate. The aforedescribed assembly is disposed on one side of an A-frame which divides the cargo area into left and right sections. The assembly is duplicated on the opposite side of the A-frame.

4 Claims, 4 Drawing Figures

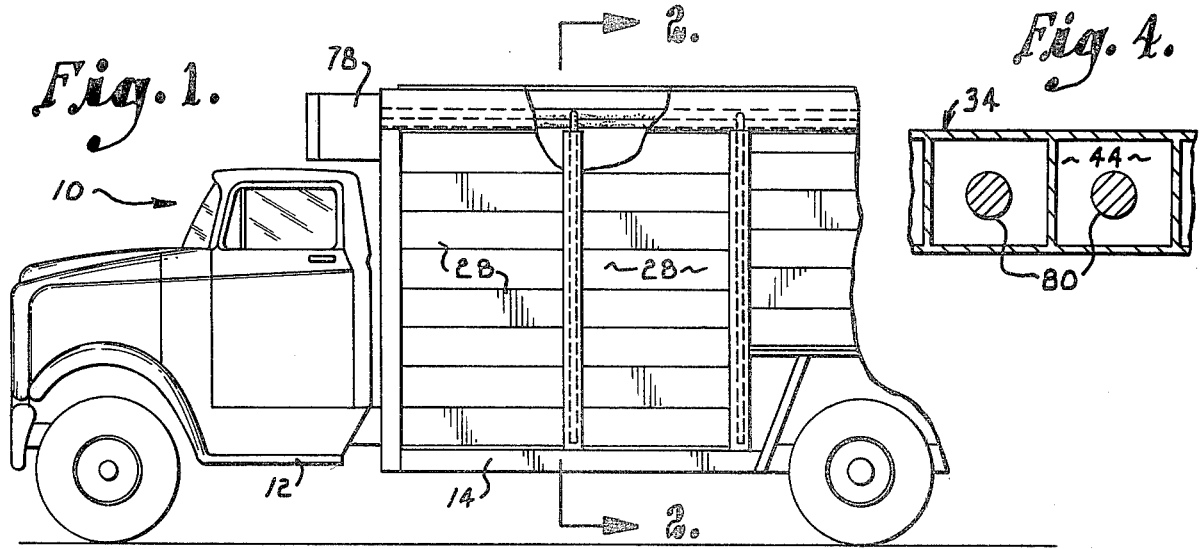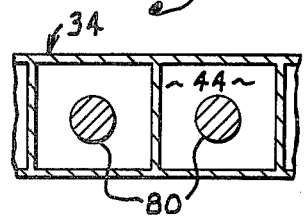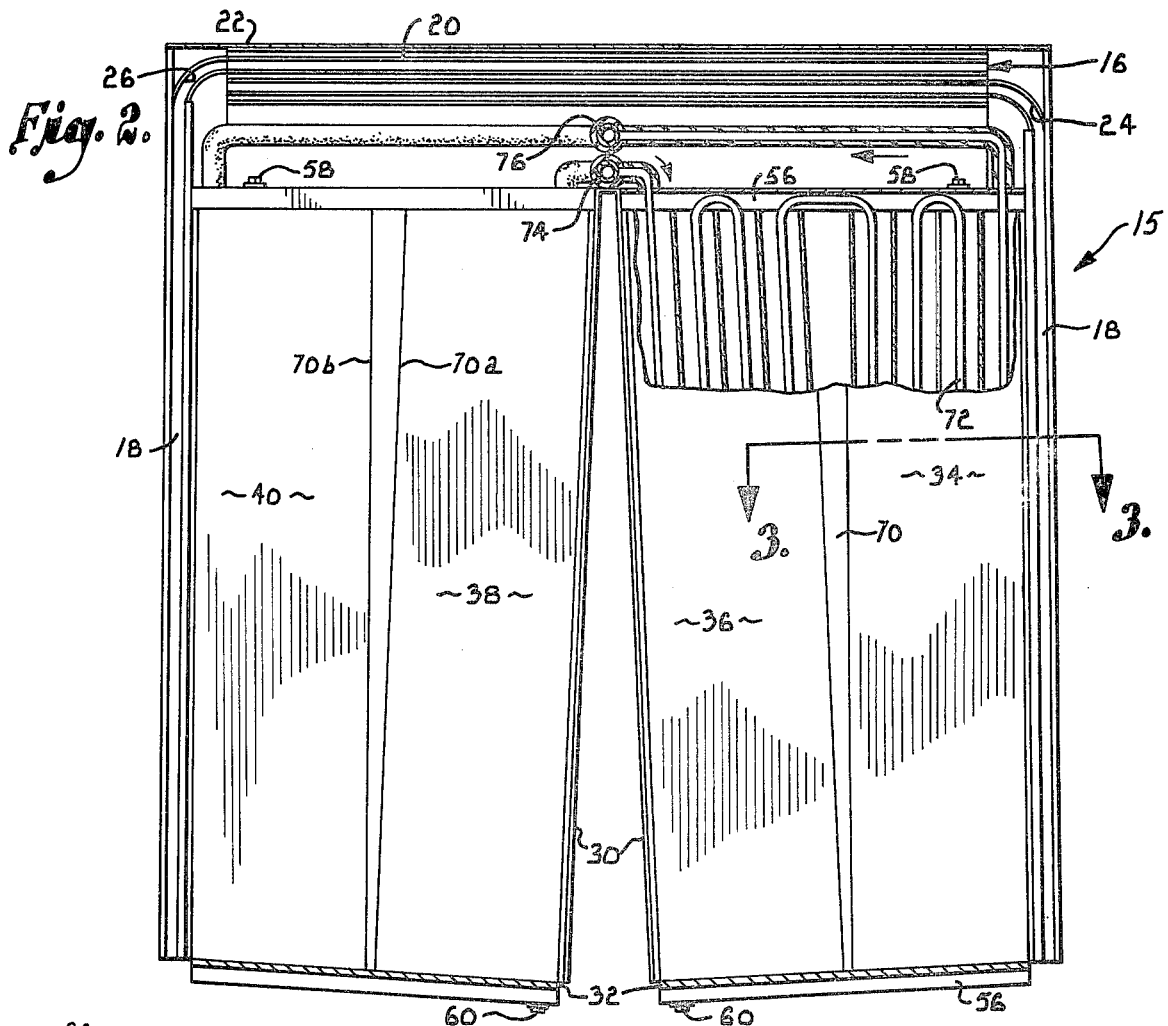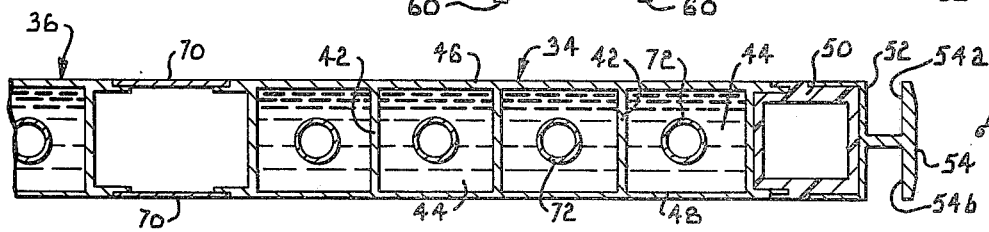

BEVERAGE VEHICLE BULKHEAD AND METHOD OF CONSTRUCTING SAME

This invention relates generally to cargo carrying vehicles and, more particularly, to a bulkhead for use in the cargo area of such a vehicle.

Many types of commodities require that they be transported from distributor to marketing entity by refrigerated vehicle. For example, refrigerated trucks and trailers are widely used to distribute beer and to a lesser degree soft drinks. Typically, a mechanical refrigeration unit will be installed in communication with the cargo area of the vehicle for maintaining this area at the desired temperature. In some instances, so-called "cold plates" are placed in the cargo area to assist in maintaining the temperature. These cold plates consist of large containers for a low melting point liquid such as ethylene glycol with a conduit for a refrigerant such as freon occupying a portion of the interior place. Cold plates of this type are coupled with a compressor run overnight thereby cooling the low melting point liquid below its melting point. Systems of this type are sometimes referred to as eutectic refrigeration because of the eutectic nature of the liquid utilized. The frozen liquid will then help to maintain the temperature of the cargo area when the vehicle enroute makes its rounds during the next day. It has been found that the energy required to freeze the cold plates is more econimical than operating the mechanical refrigeration unit on the vehicle. Better temperature control is also obtained by using the cold plates.

The aforedescribed cold plates may be installed in the cargo area of the vehicle in one of two ways. They may simply be attached by brackets to the outside of existing bulkheads or the ceiling of the cargo area. This technique adds considerable weight to the vehicle thereby increasing fuel consumption and reducing the net cargo carrying capacity of the vehicle. It also results in the cold plates being exposed where they reduce the useful area for cargo and are also subject to damage during loading and unloading. The exposed cold plates also have a greater tendency to freeze cargo and increased water condensation problems.

An alternative procedure for installing cold plates has been to insert them between the walls of existing bulkheads. This requires that the bracing for the bulkheads be cut away and rerouted so as to allow placement of the cold plate. Such a restructuring of the bulkhead is relatively expensive and, even once it is accomplished, the problem of increased weight from the cold plates still exists.

It is, therefore, a primary object of the present invention to provide a bulkhead for cargo carrying vehicles which is formed from uniform extrusions and is therefore more economical and easier to fabricate than bulkheads of the prior art.

It is also one of the objects of our invention to provide a bulkhead construction and method of forming same utilizing uniform extrusion sections thereby offering strength advantages and reduced weight over prior art constructions.

One of the primary objects of our invention is to provide a bulkhead construction and method of forming same which may be utilized as simply a divider panel within a cargo area or may be converted to a hot plate or a cold plate without structural modifications.

An important aim of our invention is to provide a bulkhead construction and method for cargo carrying vehicles which can be utilized to construct a hot plate or cold plate that can be fastened to the outside of existing bulkheads or to the ceiling of a cargo carrying vehicle.

Another one of the objectives of this invention is to provide a type of bulkhead construction for cargo carrying vehicles which bulkhead may also serve as a hot plate or a cold plate wherein the entire surface area of the bulkhead is utilized for heat transfer purposes.

Other objects of the invention will be made clear or become apparent from the following description and claims when read in light of the accompanying drawing, wherein:

FIG. 1 is a fragmentary side elevational view of a refrigerated beverage truck employing the bulkhead of the present invention;

FIG. 2 is an enlarged vertical cross-sectional view taken through the cargo area of the vehical along line 2—2 of FIG. 1;

FIG. 3 is an enlarged horizontal cross-sectional view through the bulkhead taken along line 3—3 of FIG. 2; and FIG. 4 is another fragmentary horizontal cross-sectional view showing an alternative form of the invention.

Referring initially to FIG. 1, a vehicle is designated generally by the numeral 10 and includes a truck chasis 12 with a cargo body 14.

The cargo body 14 is divided into compartments by a plurality of bulkheads 15. Each bulkhead includes a framework 16 having outside vertical stretches 18 and a horizontal stretch 20 which extends between the two vertical stretches and provides support for a roof 22. Framework 16 also presents tracks 24 and 26 for cargo doors 28 disposed on opposite sides of body 14. An A-frame 30 is disposed down the center of the cargo area and is coupled with floor sections 32 that slope inwardly toward the base of A-frame 30. Thus, the A-frame divides the cargo area into left and right sections.

First, second, third and fourth uniform extruded panel sections 34-40 are all identical and, accordingly, only one will be described in detail. Panel sections 34 and 36 are shown in detail in FIG. 3. Panel section 34 comprises alternating web portions 42 and open areas 44 sandwiched between planar surfaces 46 and 48.

Disposed at the outside end of section 34 is a thermal barrier 50 comprising a rectangular section having a hollow core and secured to section 34 by a U-shaped cap 52 which merges into an integral I 54 which presents track sections 54a and 54b.

Referring additionally to FIG. 2, U-shaped channels 56 disposed at the top and bottom of section 34 bring each of the open areas 44 into closed communication with an adjacent open area. A fill plug 58 is disposed in the upper channel 56 and a drain plug 60 is mounted in the opposite lower corner of the bottom channel 56.

First and second connecting plates 70 are each formed with one side 70a at an angle corresponding to the angle of inclination of A-frame 30 and the opposite side 70b formed at an angle corresponding to the angle of inclination of vertical frame stretch 18. Thus, each connecting plate 70 is of generally wedge shaped configuration being somewhat wider at the top than at the bottom. The two wedge plates are disposed with their sides 70a both facing the same direction and both being disposed with this side closest to A-frame 30. Extruded sections 34 and 36 are brought into planar alignment with connecting plates 70 and the two panel sections are joined together through welding of the connecting plates. It is to be understood that third and fourth panel sections 38 and 40 would be joined together in an identical manner with third and fourth connecting plates 70 identical to those previously described.

Disposed in the open areas 44 of panel section 34 is a continuous refrigerant conduit 72. Conduit 72 is coupled with an intake manifold 74 which is disposed at a central location above the A-frame 30 and likewise with a return manifold 76 mounted above the intake manifold. It is to be understood that open areas 44 are also filled with a low freezing point eutectic liquid such as ethylene glycol. Furthermore, conduit 72 will contain a refrigerant such as freon for purposes of freezing the liquid. Manifolds 74 and 76 are in communication with a mechanical refrigeration unit 78 mounted on the front of body 14.

OPERATION

Bulkhead 15 is constructed in the manner aforedescribed and may be utilized without conduit 72 and freezable liquid disposed in open areas 44. The construction is, however, advantageous and economical because of the utilization of uniform extrusion sections 34–40. When refrigeration conduit 72 is placed in open areas and these areas are filled with a low freezing point liquid, the bulkhead 15 becomes a cold plate. The cold plate may be frozen by off vehicle electrical power when the vehicle 10 is not in use and refrigeration continued while the truck is delivering cargo through operation of unit 78.

Because the entire bulkhead serves as a cold plate, a much greater surface area for heat transfer purposes is presented. On the other hand, since the bulkhead itself forms the cold plate, considerable weight savings are achieved over conventional cold plates which are inserted into existing bulkheads. Manifestly, labor savings are also achieved since it is not necessary to structurally modify the bulkhead in order to transform it into a cold plate. The use of connecting plates 70 is also very important in achieving the objectives of the present invention since this construction allows the use of uniform extrusion panels for all applications. The connecting plates 70 may be fabricated so as to accommodate variations in the slope and configuration of the cargo area of various types of vehicles. This, of course, is much more economical than modifying the extrusion or requiring that an inventory of different types, sizes and configurations of extrusions be maintained in order to accommodate all possible applications.

ALTERNATIVE EMBODIMENT

In the fragmentary view of FIG. 4, one of the panel sections 34 is illustrated with heating rods 80 disposed in open areas 44. These heating rods are coupled with the electrical system of vehicle 10 so as to provide resistance heating and transform bulkhead 15 into a hot plate. This construction is utilized in areas where exceedingly cold temperatures are encountered that would otherwise freeze certain beverages. Except for the substitution of heating elements 80 in place of refrigeration conduit 72 and the low freezing point liquid, the panel section 34 is identical to the constructions described above.

We claim:

1. A bulkhead for the cargo area of a cargo carrying vehicle, said bulkhead comprising:

a framework extending around the periphery of said cargo area and in a transverse dimension, said framework presenting outside vertical stretches and a horizontal stretch;

an A-frame section disposed in the center of said cargo area and dividing the latter into left and right sections, each of said left and right sections having a floor sloping toward the center of said area;

first and second uniform extruded sections each presenting alternating web portions and open areas sandwiched between generally planar surfaces, said first and second extruded sections being disposed on one side of said A-frame section;

first plate connecting means interposed between said first and second extruded sections and presenting first and second connecting surfaces aligned with said planar surfaces, said connecting surfaces being disposed at an angle corresponding to the angle of said A-frame on one side and at an angle corresponding to the angle of said outside vertical stretch of said framework on the opposite side;

first and second channel means disposed across the ends of said extruded sections for placing each of said open areas in closed communication with an adjacent open area;

third and fourth uniform extruded sections each presenting alternating web portions and open areas sandwiched between generally planar surfaces;

said third and fourth extruded sections being disposed on the other side of said A-frame section;

second plate connecting means interposed between said third and fourth extruded sections and presenting third and fourth connecting surfaces aligned with said planar surfaces of said third and fourth extruded sections; and third and fourth channel means disposed across the ends of said third and fourth extruded sections for placing each of the open areas of said sections in closed communication with an adjacent open area.

2. The invention of claim 1, wherein is included heat transfer means disposed in at least some of said open areas.

3. The invention of claim 2, wherein said heat transfer means comprises a conduit for a refrigerant and a freezable liquid media surrounding said conduit.

4. The invention of claim 2, wherein said heat transfer means comprises a heating element.

* * * * *